United States Patent [19]

Becker

[11] 4,143,578

[45] Mar. 13, 1979

[54] CAPPED MACHINE NUT AND METHOD OF MANUFACTURE

[75] Inventor: Phillip D. Becker, Southbury, Conn.

[73] Assignee: Buell Industries, Inc., Waterbury, Conn.

[21] Appl. No.: 801,154

[22] Filed: May 27, 1977

[51] Int. Cl.² ............................................. F16B 37/14
[52] U.S. Cl. ........................................ 85/35; 10/86 C
[58] Field of Search ............... 85/35, 53, 55; 10/86 C, 10/86 CL; 301/9 DN; 29/508, 511; 72/DIG. 1

[56] References Cited

U.S. PATENT DOCUMENTS

| | | | |
|---|---|---|---|
| 1,166,722 | 1/1916 | Stanley | 85/35 |
| 1,580,186 | 4/1926 | Wiley | 10/86 C |
| 1,904,263 | 4/1933 | Berge | 85/35 X |
| 2,018,301 | 10/1935 | Ferry | 85/35 |
| 2,487,129 | 11/1949 | Hallock | 72/DIG. 1 |
| 3,163,195 | 12/1964 | Croswell | 29/511 |
| 3,364,806 | 1/1968 | Chaivre | 85/55 X |
| 4,015,503 | 4/1977 | Romano | 85/35 |
| 4,056,862 | 11/1977 | Chaivre et al. | 10/86 C X |

FOREIGN PATENT DOCUMENTS

| | | | |
|---|---|---|---|
| 646842 | 11/1928 | France | 85/35 |
| 916161 | 1/1963 | United Kingdom | 85/53 |

*Primary Examiner*—Rodney H. Bonck
*Attorney, Agent, or Firm*—St. Onge, Mayers, Steward & Reens

[57] ABSTRACT

There is disclosed a capped machine nut comprising a polygonal-sided metal nut body having a conical bearing surface projecting from a first axial end, the opposite axial end and the polygonal sides of the body being encased in a sheet metal cup-shaped cap tightly conforming to the polygonal nut body but spaced from said opposite axial end to form a dome. The nut body is formed with a peripheral groove axially intermediate the polygonal sides and conical bearing surface, wherein the shoulder of the groove adjacent the polygonal sides is substantially right-angled so that the lip of the cap skirt can effectively grip the shoulder when crimped into the groove, and thereby retain the cap on the nut body. In a preferred form, the lip of the cap skirt is doubly crimped by folding the skirt edge into the groove at the apices of the polygonal sides, and also intermediate the polygonal apices.

4 Claims, 10 Drawing Figures

U.S. Patent  Mar. 13, 1979  Sheet 1 of 2  4,143,578
FIG. 1
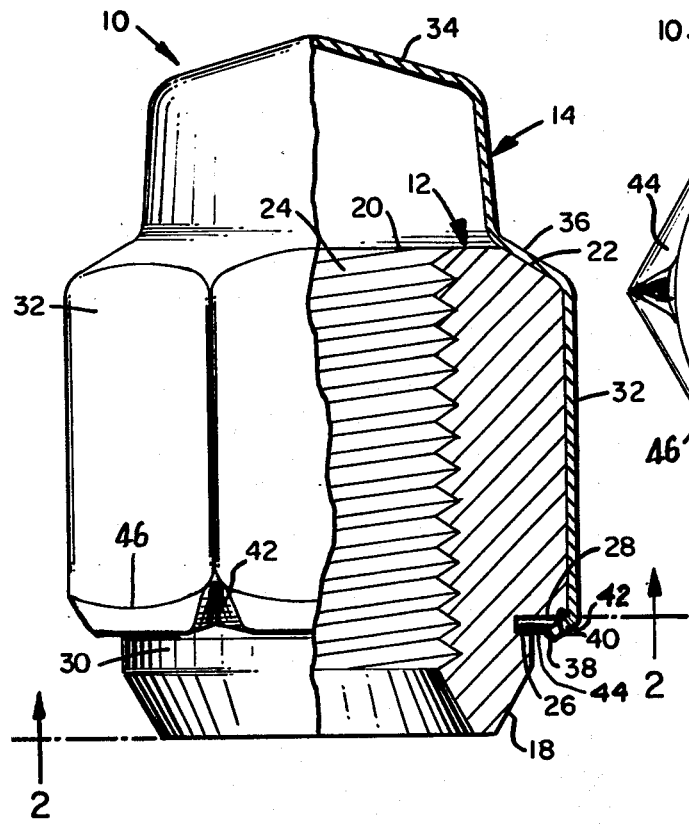
FIG. 2
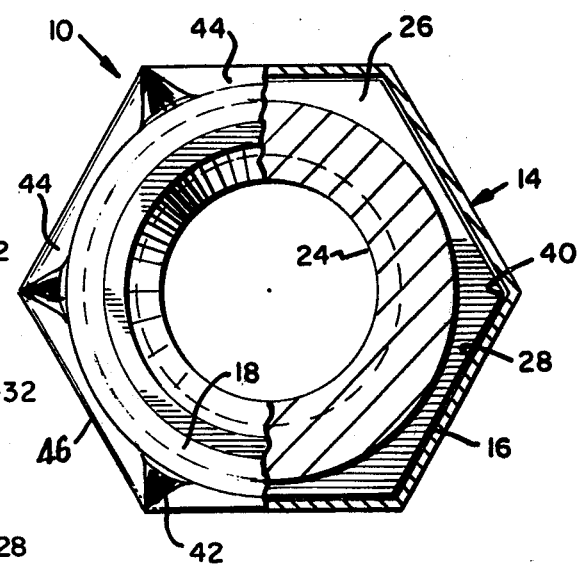
FIG. 3
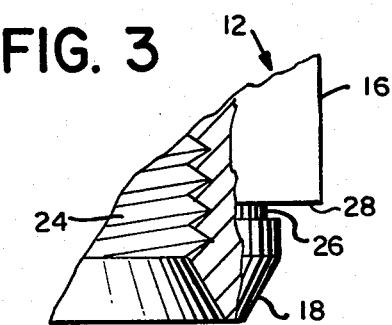
FIG. 4
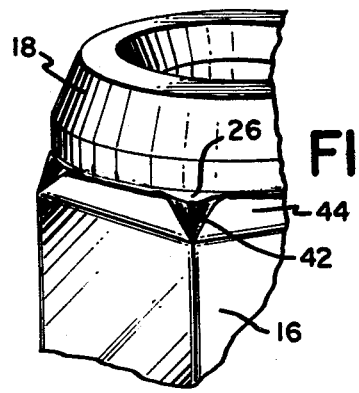
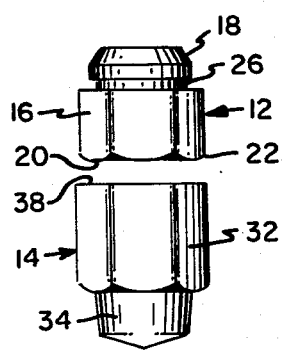
FIG. 5
FIG. 6
FIG. 7
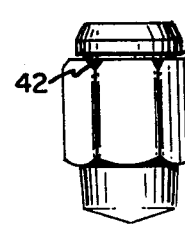
FIG. 8
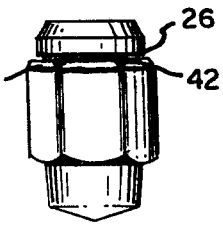
FIG. 9

CAPPED MACHINE NUT AND METHOD OF MANUFACTURE

BACKGROUND OF THE INVENTION

1. Field of Invention

The invention concerns capped machine nuts comprising a polygonal-sided cold-formed, forged or extruded metal nut body, and a cup-shaped sheet metal cap enclosing one end face and the side walls of the body. The invention is more particularly concerned with capped wheel nuts used in detachably securing automobile wheels to their hubs.

2. Description of the Prior Art

It has been standard practice in the automotive industry for many years to use hub caps or wheel covers to enclose the circle of lugs and lug nuts used to detachably secure the wheels to the axle or spindle hubs. Such hub caps or wheel covers serve to protect the fastening means from exposure to road dirt, rust or other corrosion, etc., which impede removal and replacement of a wheel. The covers have also served as means for enhancing the appearance of the wheel. However the covers are expensive, add weight to the car and often become lost due to failure, under the extreme stresses imposed by high speed and rapid maneuvering of the vehicle, of the means employed to attach the covers to the wheels. Accordingly many car manufacturers have redesigned their wheel structures to eliminate the use of wheel covers, but this of course leads back to exposure of the studs or lugs and wheel nuts; i.e., to the very conditions that brought on resort to wheel covers in the first place. The use of capped nuts has been proposed as a solution. These provide individual protection of the exposed portions of the mating threads of the lugs and nuts, more particulary at the axial outer end of the lugs. The lug nuts themselves must be made of machinable grades of steel, in order to permit satisfactory fabrication of the threads and to provide the required strength, yet be as low cost as possible. Such steel, however does not lend itself readily to good nickel/chrome plating, which is desired for the sake of better appearance since the nuts will be fully visible when installed on a car. Therefore machinable steel has been used for the nut body, and this body is then combined with a separate sheet metal cap of non-corrosive stainless metal, again usually steel. The cap is designed to cover the axial outer end of the nut body and as much of its side walls as is necessary for appearance design considerations. The cap must of course be secured to the nut body adequately to withstand the very heavy torque loads produced by the usual impact wrench forces involved when the car wheels are removed and replaced because of flats, tire wear, rotation or snow tire replacement, for example. Such impact wrench forces are very substantial and inevitably produce slight deformation or other distortion of the nut body, as well as peening and stretching of the metal in the cap. Thus, even though a tight, close fit may be initially obtained between the nut body and its cap, this distortion, stretching, etc., tends to loosen the caps and nut bodies, and annoying rattles result.

The prior art has experienced this and other difficulties unique to automotive wheel nuts, and several solutions have been proposed. Probably the currently most significant wheel nut proposals are disclosed in the U.S. Pat. Nos. to Chaivre 3,364,806, dated Jan. 23, 1968, and Romano 4,015,503, dated Apr. 5, 1977. Capped wheel nuts of both types disclosed in these patents have been produced commercially and used by major automobile companies. Both types are subject to certain difficulties or disadvantages. For example, capped wheel nuts of the kind disclosed in the earlier patent mentioned above, when manufactured on a mass production scale to meet demand and be economically feasible, are subject to loosening and rattling of the cap after only a very few on-off cycles using a conventional impact wrench. Industry requirements usually specify that the nuts be capable of withstanding at least 10, preferably 12, on-off cycles using commercial impact wrenches. Attempt has been made to spot-weld the cap to the nut body to supplement the cap-attaching method shown in the patent. This welding operation is not easy to do in automated mass production, adds another manufacturing operation, is expensive and tends to impair the appearance of the finished nut even when special buffing or polishing is employed. Improvements in cap retentive capability is claimed for the nut structure shown in the second patent mentioned above, but that design requires the nut body to be accurately machined, as on an automatic screw machine, to provide a characterizing low-angled conical surface and reversely conical shelf as the surface against which the lip of the cap is formed by peripherally continuous swaging of its lip to effect a grip adequate to retain the cap on the nut body. Since an accurate screw machining operation is involved, it is not feasible to use low-carbon, lower cost steels because poor chip formation of such steels is a major problem in screw machining procedures. Thus more expensive steels for the nut bodies is required. Other problems of manufacture and use may also be encountered.

SUMMARY OF THE INVENTION

It is a general object of this invention to provide further improvements in capped wheel nuts, particularly for automotive use, so that they can be mass-produced economically, yet will nevertheless meet the rigorous standards set for on-off cycles without loosening or annoying rattle of the cap portions on the nut bodies. It is a further purpose to provide a capped nut design which lends itself well to use of lower cost, low carbon, steels for the nut bodies so that these can be cold formed for greater economy.

Briefly, the capped machine nut here disclosed is characterized by the formation of a peripheral groove located axially intermediate the conventional polygonal side walls and conical bearing face on one end of an automotive wheel lug nut. This groove is configured to form a substantially right-angled shoulder immediately adjacent and axially terminating the polygonal side walls. While a sharp, essentially right-angled shoulder is required, highly accurate machine tools, such as automatic screw machines, are not required since a very serviceable right-angled shoulder can be formed using a collet cutter on a reciprocable spindle tool, e.g. a tapping machine or drill press, without encountering the aforesaid chip problem. The lip of the cup-shaped sheet metal cap, when crimped over the shoulder in securing the cap to the nut, is thus provided with a very effective ledge on which to grip.

The cap is formed with a domed portion adapted to extend axially beyond the outer flat face of the nut body, which accommodates projection of the lug beyond the flat face of the nut when tightened down. This domed portion is integrally faired into the polygonal side walls of the cap to form an annular seat adapted to rest on the periphery of the flat face of the nut, serving as a locating means in assembling the cap to the nut body. In the preferred embodiment, the cap is doubly crimped to the nut body; that is one crimp configuration involves forcing the lip of the cap radially inward of the groove at the apices of the polygonal sides. The crimp formations produced at these points assume a generally triangular shape, with the center of the triangle depressed in relation to the adjacent sides of the triangle. This provides an indented dihedral formation of the lip at each corner or apex. In addition, crimping is performed along the side walls of the nut so that the lip of the cap forms a tab or flange intermediate the corner crimps first produced. The two sets of crimps thus grip the edge of the right-angled shoulder of the peripheral groove and the resulting lip configuration produces a unique structural formation that strongly resists any forces tending to lossen the grip of the cap on the nut body.

BRIEF DESCRIPTION OF THE DRAWINGS

FIG. 1 is a view in side elevation, partly in section, of an assembled capped wheel nut of this invention;

FIG. 2 is an end view, also partly in section, taken on line 2—2 of FIG. 1;

FIG. 3 is a fragmentary enlarged view of the peripheral groove in the nut body;

FIG. 4 is a fragmentary enlarged view, in perspective, showing details of the crimp of the cap in the assembled nut;

FIGS. 5 through 9 are sequential views of nut bodies and caps in successive stages of assembly, in accordance with the method of manufacture involved in the invention.

DETAILED DESCRIPTION OF PREFERRED EMBODIMENT

Figure 10:
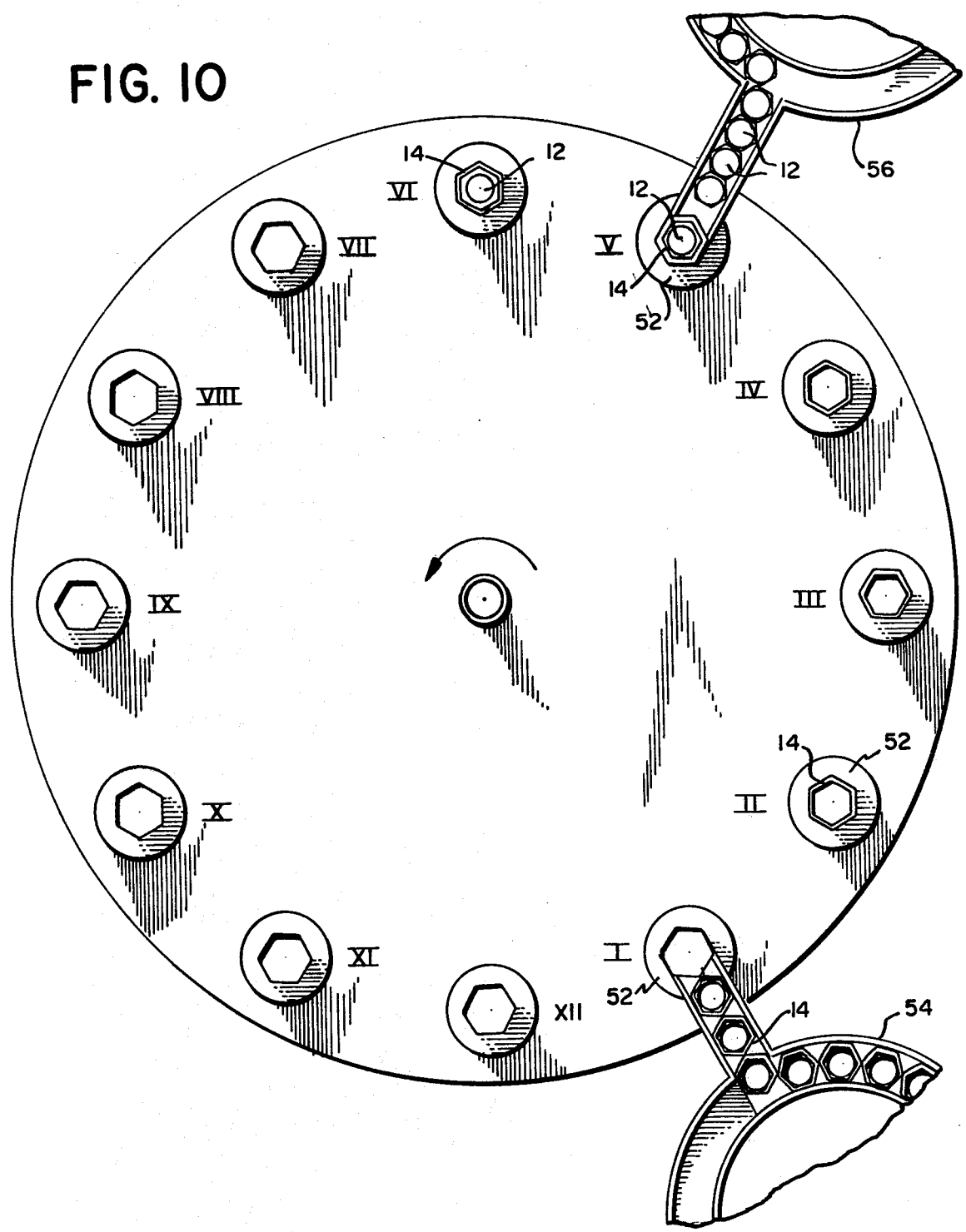
FIG. 10 is a schematic view in plan of dial-feed mechanism for accomplishing automatic assembly of the nut bodies and caps at successive operating stations.

The general nut structure is best illustrated in FIGS. 1 and 2, wherein capped wheel nut 10 includes a relatively thick-walled nut body 12 to which a relatively thin-walled cap 14 is secured, as will be more fully described hereinafter. The body 12 of the nut is formed with polygonal side walls 16 for wrenching purposes, being usually hexagonal as shown in FIG. 2. At a first axial end, the nut is formed to provide a conical bearing surface 18 which is adapted to mate with the conical depressions surrounding the lug holes of a typical pressed-steel automotive wheel. At the axially opposite end, the nut face is essentially flat except for a slight champfer of its outer periphery to form a shoulder 22. Nut 10 is provided with threads in axial bore 24 adapted to mate with the wheel lugs.

A peripheral groove 26 is formed in the nut body at a point axially intermediate the conical bearing surface 18 and the polygonal side walls 16 of the nut body, groove 26 forming a substantially right-angled shoulder 28 immediately adjacent and axially terminating the polygonal side walls 16, as shown in greater detail in FIG. 3.

In the preferred method of manufacturing nut bodies 12, they are cold-formed from low-carbon steel rod. In the process, a length is cut, pierced to form the axial bore, and formed to provide a nut blank having a conical bearing surface at a first end, and substantially flat face at the opposite end. As initially formed, the region 30 of the nut between conical bearing surface 18 and polygonal side walls 16 is cylindrical, having a diameter substantially equivalent to the distance between the centers of the nut faces. In secondary operations the nut blank is tapped to form the threads of bore 24, and groove 26 is formed. The groove formation can be done by any of several machining methods, but preferably is done with a reciprocable rotating collet incorporating internal cutting bits which engage the cylindrical region 30 of the nut body as the collet is brought down over the conical bearing end of a nut. The latter is suitably nested in a fixture to prevent it from turning as the groove-cutting operation is performed. Other means can of course be employed for cutting groove 26, and the manner selected will be determined more by economies of production method and available equipment existing at any given manufacturer.

Cap 14 is blanked from sheet metal stock and drawn to provide a cup-shaped member having polygonal side walls 32 and a dome portion 34 which is faired to join side walls 32, forming an annular seat or shelf 36. As originally drawn the lip 38 of cap 14 at its open end is straight, comprising simply a continuation of polygonal sides 32 (see FIG. 5) so as to permit insertion of nut bodies 12. The axial length of the polygonal side walls 32 is so determined that the distance between annular seat 36 and the free edge of lip 38 disposes that lip circumferentially adjacent groove 26 when nut body 12 is fully inserted into cap 14. Such position is determined by abutment of peripheral shoulder 22 of the nut body against the annular seat 36 of the cap. See FIGS. 1 and 7. Cap 14 is configured so that its polygonal side walls 32 closely conform to the side walls 16 of the nut body when inserted in the cap. See FIG. 2.

Cap 14 is secured to nut body 12 by crimping lip 38 into annular groove 26 of the nut body when the two have been assembled, as shown more particularly in FIG. 7. It is a feature of the invention that a double polygonal (in this case hexagonal) crimp of the lip 38 be effected. One crimp is performed at the corners or apices 40 of adjacent nut faces 16. The other crimp is performed on the lip between the apices 40. In both cases, lip 38 of cap 14 is bent sharply inwardly of groove 26, around shoulder 28 of the nut which, because of its substantially right-angle, provides a secure point of engagement for the lip. In forming the crimp at apices 40, the lip of the cup is indented at each point to assume a generally triangular configuration 42, as shown in FIG. 2 and in greater detail in FIG. 4 of the drawings. In this crimping operation, the metal along the central axis of the triangular crimp is slightly depressed below the level of the adjacent lateral sides of the triangle providing an indented dihedral formation in the lip at each corner or apex. Since the portions 44 of lip 38 intermediate the aforesaid triangular formations 42 are also crimped inwardly of groove 26 to form a sharp bend 46 over right-angled shoulder 28 of the nut, the resulting lip configuration is uniquely adapted to resist any tendency of the crimps to become loosened, as through repeated heavy torque applications imposed by impact wrench installation and removal of the nuts on the wheel lugs. This unique configuration is particularly effective if the sequence of crimping operations performed on the lip is such that it is first crimped at the apices of the walls of the nut body, and then subsequently along the wall sides, intermediate the apices.

As mentioned above, in the manufacture of the capped nut, the cold-formed nut blanks are tapped to provide threads in bore 24, and then the nuts are machined to form the peripheral groove 26, as also already described. The caps, such as that shown in FIG. 5, are blanked from sheet metal and drawn to the cupped condition shown. After this the cap and nut body are assembled and the cap is crimped onto the body, as illustrated in FIGS. 6 through 9. These operations may be automatically performed using typical dial-feed mechanism, such as that illustrated schematically in FIG. 10. This comprises a table or dial 50 which is rotated in the direction of the arrow and which is provided with a sequence of fixtures or nests 52 (12 being here illustrated) spaced about the periphery of dial 50. Caps 14 are fed by conventional automatic feed device 54 to position one cap, open end up, in each nest 52 as it arrives at Station I. As dial 50 advances the caps through successive Stations II, III and IV, various functions may be formed, for example testing to see that there is a cap located in each nest, that the cap is properly inserted and not upside down, and that the cap is fully seated in the nest. Other preparatory operations can of course be incorporated, as may be needed or desired. At Station V, a second automatic feed device 56, similar in function to device 54 feeds nut bodies 12 into preliminary position for insertion into a cap. This condition is illustrated schematically in FIG. 5. At Stations VI, VII and VIII in the progress of dial 50, the nut bodies are fully inserted in the cap, tested to see that a nut body is present and that it is present in proper relation to the cap and not upside down, and that it is fully inserted into a cap. The condition of the assembly at this stage is illustrated in FIGS. 6 and 7. At Stations IX and X in the continued travel of dial 50, crimping of the lip of the cap into the peripheral groove of the associated nut body is accomplished. As mentioned above, preferably at Station IX, the crimping operation indents the cap lip at the apices of the nut walls, and this is immediately followed by crimping of the intermediate portions of the cap lip at Station X. At Stations XI and XII in the continued sequence of operation through which dial 50 advances the components, such operations as final inspection and ejection of the assembled capped nuts are performed.

What is claimed is:

1. A capped machine nut comprising a metal body with polygonal side walls and a threaded bolt hole extending axially through said body, said nut body having a conical bearing face at a first axial end and a first shoulder at its opposite axial end, a peripheral groove in said nut body located axially intermediate said conical bearing face and said polygonal side walls, said groove forming a substantially right-angled second shoulder immediately adjacent and axially terminating said polygonal side walls; and a cup-shaped sheet metal cap having polygonal side walls closely conforming to the side walls of said nut body and preventing relative rotational movement between them, said cap at its closed end having a domed portion extending axially beyond said first shoulder of said nut body, said domed portion joining said polygonal side walls of said cap to form an annular seat which rests on said first shoulder of said nut body to maintain said domed portion in axially spaced relation to said first shoulder of said nut body, said cup having the lip at its open end extending from said side walls of said nut body over said right-angled second shoulder, first, sharply axially inwardly of said groove at each apex of two of said nut body side walls in a triangular shape to form dihedrals converging inwardly of said groove and, second, sharply inwardly of said groove intermediate each pair of said apices to secure said nut body and cap together against relative axial and relative rotational movement and whereby the configuration of the lip of said cap as aforesaid resists the tendency to loosen from extend-over said right-angled second shoulder inwardly of said groove.

2. The method of making a capped machine nut having a polygonal-sided metal nut body having a first shoulder at one axial end, a conical bearing surface at the opposite end and a threaded bolt hole extending axially through said body, and a cup-shaped sheet metal cap having polygonal side walls adapted to closely conform to the side walls of the nut body and prevent relative rotation between them, said cap further having at its closed end a domed portion integrally formed with said side walls to provide an annular seat adapted to abut the first shoulder of said nut, wherein said method comprises the steps of forming a peripheral groove in said nut body axially intermediate said conical bearing surface and said polygonal side walls to provide a substantially right-angled second shoulder immediately adjacent and axially terminating said polygonal side walls, inserting said nut body into said cap to cause said first shoulder to abut said annular seat in said cap, and crimping the lip at the open end of said cup into said peripheral groove sharply axially inwardly over said right-angled second shoulder at each apex of two of said nut body side walls to produce triangular dihedrals converging inwardly of said groove and sharply inwardly over said right-angled second shoulder intermediate each pair of said apices, said dihedrals thereby being locked in such condition by the crimped portion of said lip intermediate said apices.

3. The method as defined in claim 2, wherein said crimping of said lip of said cap is performed in separate steps at the apices of the polygonal sides and also intermediate said apices.

4. The method as defined in claim 3, wherein said crimping is done first at said apices and then intermediate them.

* * * * *